(12) United States Patent
Oudet et al.

(10) Patent No.: US 6,236,125 B1
(45) Date of Patent: May 22, 2001

(54) LINEAR ACTUATOR

(75) Inventors: Claude Oudet; Pierre Gandel; Didier Frachon; Christophe Besson, all of Besancon (FR)

(73) Assignee: Moving Magnet Technologies (S.A.), Besancon (FR)

( * ) Notice: Subject to any disclaimer, the term of this patent is extended or adjusted under 35 U.S.C. 154(b) by 0 days.

(21) Appl. No.: 09/402,461
(22) PCT Filed: Feb. 3, 1999
(86) PCT No.: PCT/FR99/00235
  § 371 Date: Nov. 2, 1999
  § 102(e) Date: Nov. 2, 1999
(87) PCT Pub. No.: WO99/40673
  PCT Pub. Date: Aug. 12, 1999

(30) Foreign Application Priority Data

Feb. 9, 1998 (FR) .................................................. 98 01502

(51) Int. Cl.[7] .................................................. H02K 41/00
(52) U.S. Cl. .................................................. 310/12
(58) Field of Search .............................. 310/12, 51, 156, 310/42

(56) References Cited

U.S. PATENT DOCUMENTS

| | | | |
|---|---|---|---|
| 5,175,457 | * 12/1992 | Vincent | 310/15 |
| 5,386,275 | * 1/1995 | Kato et al. | 335/219 |
| 5,475,277 | * 12/1995 | Johnson | 310/156 |
| 5,559,378 | 9/1996 | Oudet et al. | 310/17 |
| 6,081,052 | * 6/2000 | Hosoe et al. | 310/42 |

FOREIGN PATENT DOCUMENTS

| | | | |
|---|---|---|---|
| 38 20711 | * 12/1989 | (DE) | . |
| 9301646 | * 1/1995 | (WO) | . |

* cited by examiner

Primary Examiner—Nestor Ramirez
Assistant Examiner—Judson H. Jones
(74) Attorney, Agent, or Firm—Oblon, Spivak, McClelland, Maier & Neustadt, P.C.

(57) ABSTRACT

A linear uniphase polarized electromagnetic actuator. The actuator includes a coiled stator and one part which is movable in the direction OX with the useful travel of Xc. The movable part is moved according to the current traveling in the coil and the direction of travel depends on the direction of the current. The movable part includes a yoke of soft magnetic material having at least one magnet coupled with the yoke. The magnet is partially set inside a cavity of the mobile yoke on the side of the stator poles at a depth e such that $0.1\,L < e < 0.9\,L$, where E is the distance measured perpendicularly to OX between the stator poles and the cavity end pole.

20 Claims, 9 Drawing Sheets

LINEAR ACTUATOR

BACKGROUND OF THE INVENTION

1. Field of the Invention

The present invention relates to the field of linear actuators with permanent magnet, which in general is thin. Such linear actuators comprise a stator structure having two poles excited by an electric coil, plus a moving part provided with a yoke and a magnetized portion.

2. Discussion of the Background

The general principle of such actuators is described in French Patent FR 97/10585.

Such actuators employ a magnetic structure comprising three thin magnets magnetized in alternating directions.

A first disadvantage of the prior art actuators is the need for three permanent magnets. High-performance magnets are relatively expensive, and for this reason the prior art structures have a high manufacturing cost.

A second disadvantage is related to the fact that the alternation of polarity of the thin magnets makes it necessary to magnetize the magnets before assembly, and thereafter to bond the three magnets adhesively to the yoke.

A third disadvantage of the prior art actuators results from the fact that the magnetostatic force produced by the architecture of these actuators tends to pull the moving portion backward strongly in the middle of its travel, thus causing problems for certain applications.

SUMMARY OF THE INVENTION

The object of the present invention is to provide an improved actuator which remedies these disadvantages while retaining a satisfactory force per ampere-turn.

In the state of the art there have been suggested actuators which have a moving portion formed by a magnet embedded in a yoke of soft magnetic material. Such an embodiment is suggested in U.S. Pat. No. 5,175,457, or in FIG. 1 of International Patent WO 86/05928. The Applicant has established that the force is not constant as a function of position when the number of ampere-turns applied to the coil is increased (see FIG. 1).

Embodiments have also been suggested in which the magnet is fixed on the surface of the yoke. Such an embodiment is suggested in U.S. Pat. No. 4,195,277. For such actuators, the force remains substantially constant along the useful travel. In this case, the Applicant has established that the efficiency is poor, and in any case inferior to the efficiency of actuators of the first type (see FIG. 2).

The purpose of the invention is to provide an actuator having a substantially constant force along the travel with improved efficiency. The invention which is the object of the present patent results from the Applicant's analysis of the influence of position of the magnet in the interior of the yoke on the characteristics of an actuator, and from the design, on the basis of the said analysis, of a new type of actuator having optimized performance.

To this end, the invention relates to a linear electromagnetic actuator comprising a stator structure having two poles excited by at least one electric coil, plus a moving portion provided with a yoke and a magnetized portion, characterized in that the moving portion is provided with one or two permanent magnets magnetized in a direction perpendicular to the plane of the air gap, seated in a cavity provided in the moving yoke, which is made of ferromagnetic material.

The cavity depth e is chosen judiciously so as to increase the force delivered by the actuator compared with the case without cavity (e=0), while retaining a substantially constant force along the useful travel.

When the actuator is not saturated, the force created along the axis OX of the degree of freedom of the moving portion can be resolved into three components: the magnetostatic force $F_0$ (without current), which is often negligible over the useful travel Xc, a polarized force component $F_{nI}$ proportional to the ampere-turns nI, and a force component $F_{nI^2}$ proportional to the square of the ampere-turns, due to the variable reluctance created by the cavity (see FIGS. 1 and 2):

$$F \approx F_{nI} + F_{nI^2}$$

For a given value nI of ampere-turns, the force components increase with increase of the thickness e of the cavity in which the magnet is placed (see the notations in FIG. 4).

Without cavity, e=0, $F_{nI^2}=0$.

The force component $F_{nI}$ is almost constant along the useful travel, regardless of the value of e. In contrast, the component $F_{nI^2}$ varies linearly with position. To obtain a substantially constant force over the entire travel for a given value of ampere-turns, it is necessary to have a relatively low $F_{nI^2}/F_{nI}$ ratio, for example lower than 15%. This ratio can be expressed to a first approximation by an equation of the type $$\frac{F_{nI^2}}{F_{nI}} = 0.25 \cdot \frac{X^2}{1-X} \cdot \frac{ni}{H_c \cdot L}$$

where X=e/E represents a coefficient of embedding and E denotes the air gap between the bottom of the cavity in which the magnet is placed and the plane passing through the surface of the stator poles, without deduction of the thickness of the magnet;

nI is the magnetic potential created in the magnetic circuit by the current passing through the coil or coils;

$H_c \cdot L$ is the magnetic potential of the magnet, $H_c$ is its coercive field and L is its thickness in the magnetization direction.

The $F_{nI^2}/F_{nI}$ ratio strictly increases with cavity depth e.

For a given magnet and value of ampere-turns, the cavity height e is chosen to be as large as possible, in order to increase the force while keeping the $F_{nI^2}/F_{nI}$ ratio relatively low, for example lower than 0.15, in order to obtain a substantially constant force along the travel.

The cavity depth e is then chosen judiciously (0.1 L<e<0.9 L), by appropriate calculation and/or simulation, in order to optimize the force delivered by the actuator.

For very small values of ampere-turns (ni<100 At), the cavity depth will preferably be greater than 50% of the thickness of the magnet, most preferably on the order of 80%.

For large values of ampere-turns, the cavity depth will preferably be less than 50% of the thickness of the magnet, most preferably on the order of 40%.

The relation defining the $F_{nI^2}/F_{nI}$ ratio can be determined rigorously and precisely by taking into account the leaks and relative permeability of the iron.

According to a first modified embodiment, there are used two magnets, magnetized in the same direction and partly embedded in two cavities, each situated at one end of the ferromagnetic yoke.

According to a first modification, the stator structure is provided with two legs, each wound by an electric coil.

According to a second modification, the stator structure is of tubular shape and is provided with an internal annular recess in which there is seated an annular coil, the moving portion being formed by a ferromagnetic internal tubular yoke provided with an annular recess of depth e in which there is positioned a radially magnetized annular magnet.

According to a third modification, the actuator according to the invention comprises an internal stator structure of tubular shape and is provided with an annular recess in which there is seated an annular coil, the moving portion being formed by a ferromagnetic external tubular yoke provided with an annular recess of depth e in which there is positioned a radially magnetized annular magnet.

According to another modification, the linear actuator according to the invention comprises two moving portions, the magnets of one moving portion being magnetized in the direction opposite to that of the magnets of the other moving portion under the effect of the current, the two moving portions being displaced in opposite directions.

BRIEF DESCRIPTION OF THE DRAWINGS

The invention will be illustrated hereinafter with reference to the attached drawings, wherein.

DETAILED DESCRIPTION OF THE PREFERRED EMBODIMENTS

According to a preferred first modification, the width of the stator poles is greater than or equal to Xc, preferably substantially equal to Xc+E, in order to obtain a force with constant current varying very little over the entire travel, where Xc denotes the useful travel of the moving element in the zone of residual force substantially zero in the absence of current, and E denotes the air gap between the bottom of the cavity in which the magnet is placed and the plane passing through the surface of the stator poles, without deduction of the thickness of the magnet.

According to an advantageous modification, the width of the moving yoke is greater than or equal to 3 Xc+Xo, preferably substantially equal to 3 Xc+Xo+3 E, where Xo is the distance between the stator poles.

According to a modified embodiment, the moving element is provided with a single magnet partly embedded in a cavity which, along the axis OX, is situated substantially in the middle of the ferromagnetic yoke, the cavity and the magnet having a width greater than or equal to Xc+Xo, preferably substantially equal to Xc+Xo+E.

According to a modified embodiment, the moving element is provided with two magnets partly embedded in two cavities, each situated at one end of the ferromagnetic yoke, each cavity and each magnet having a width along the axis OX greater than or equal to Xc, preferably substantially equal to Xc+E.

Figure 3:
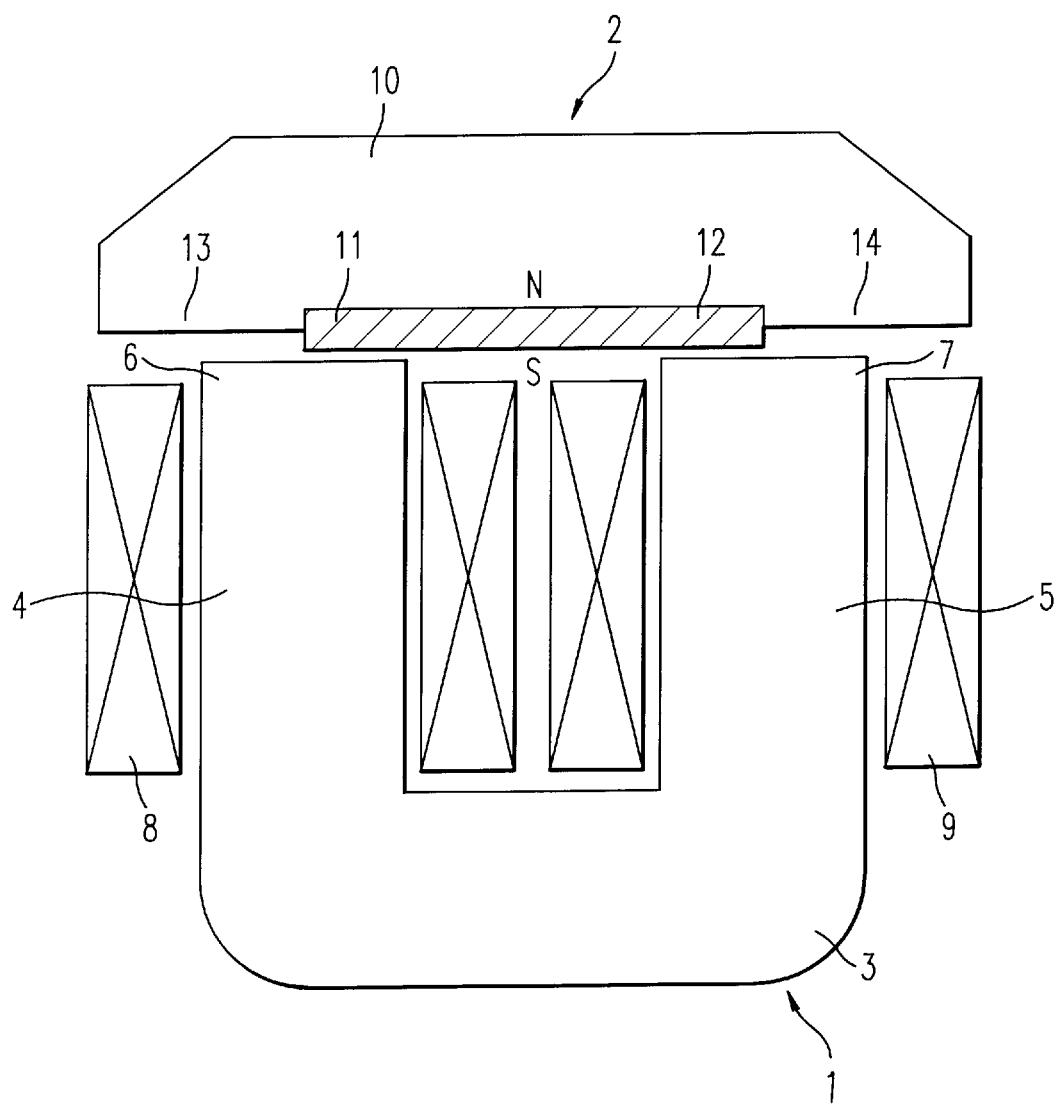
FIG. 3 represents a cross-sectional view through the center of a firs embodiment.
Figure 4:
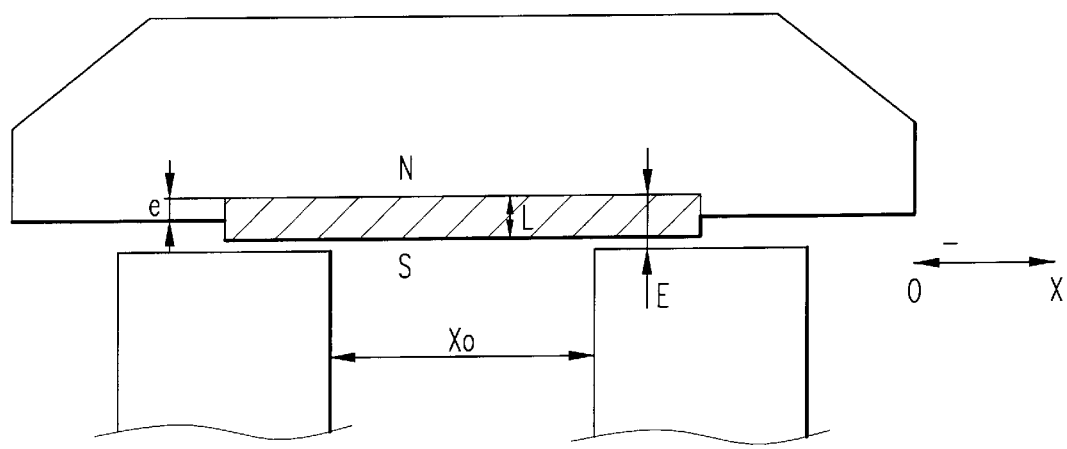
FIG. 4 presents a schematic view illustrating the different dimension.

FIG. 3 represents a sectional view of a first embodiment. The actuator is formed by a stator portion (1) and a moving portion (2).

Stator portion (1) is formed by a part (3) of ferromagnetic material provided with two legs (4, 5) having poles (6, 7) of width substantially equal to Xc+E.

Each of the stator legs (4, 5) is wound by an electric coil (8), (9) respectively.

The moving portion is formed by a yoke (10) of trapezoidal shape. The yoke, which is made of ferromagnetic material, has a width along the axis OX substantially equal to 3 Xc+Xo+3 E. It is provided with a rectangular cavity (11), inside which there is partly embedded a thin permanent magnet (12) magnetized perpendicular to OX. This thin magnet (12) has a width substantially equal to Xc+Xo+E.

The yoke extends on both sides of magnet (12) in the form of ferromagnetic extensions (13, 14) of width substantially equal to Xc+E.

Magnet (12) is partly embedded in yoke (10), the depth e of the cavity being chosen in such a way as to optimize the force for the given application.

A clearance of a few tenths of one millimeter exists between the surface of the magnet and the surface of the stator poles.

For a well chosen cavity depth e, the force component $F_{nI^2}$ is substantially negligible over the useful travel. The force produced over the useful travel Xc by the flux of a number nI of ampere-turns in each of the two coils has the value given by:

$$F = 2 \cdot Br \cdot L/(2 \cdot E - e) \cdot Z \cdot 2 \cdot nI,$$

where

Br denotes the remanent induction of the magnet

L denotes the thickness of the magnet

Figure 1:
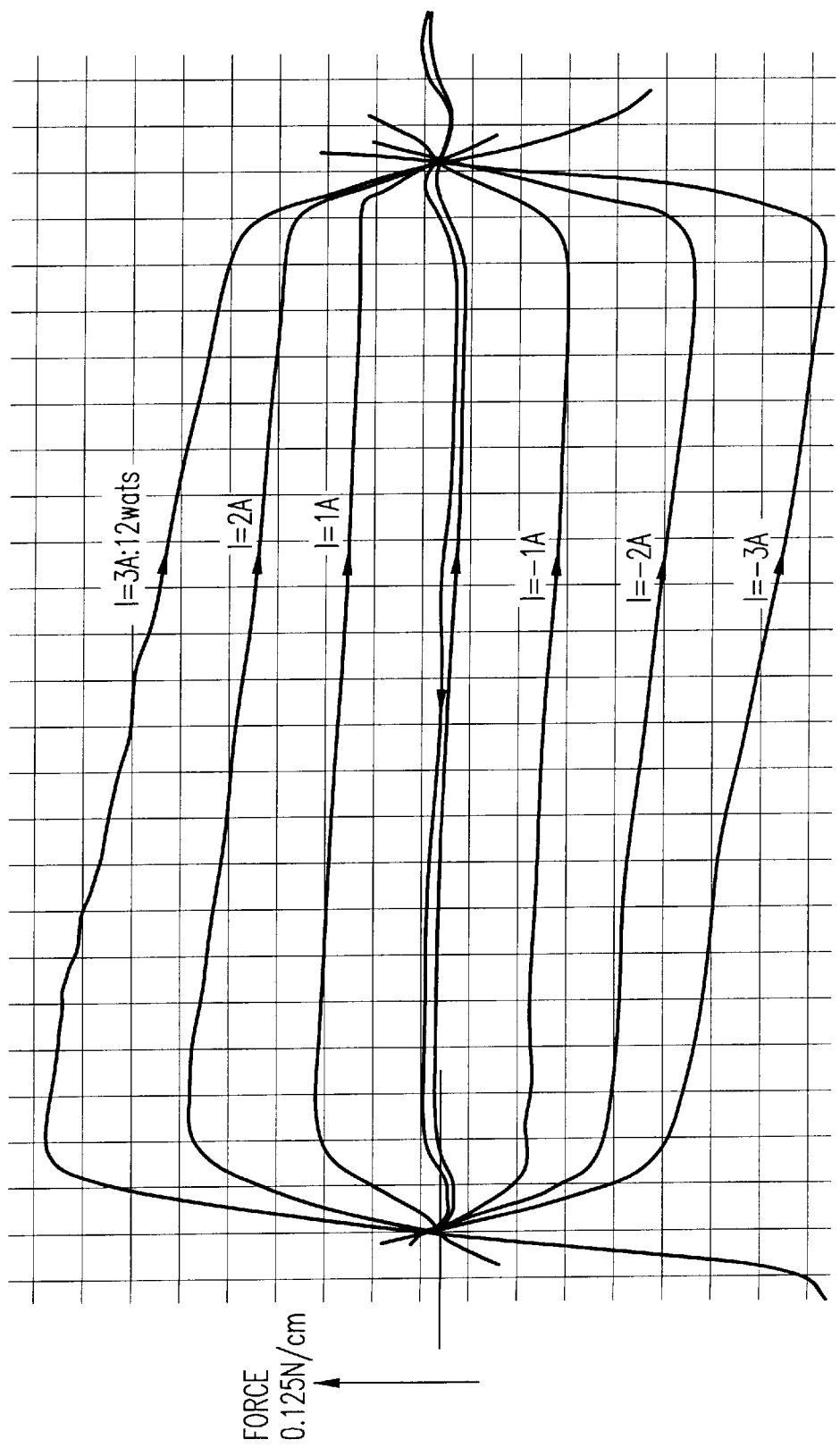
FIG. 1 represents a diagram of the forces as a function of position and of ampere-turns of the actuators according to the prior art.
Figure 2:
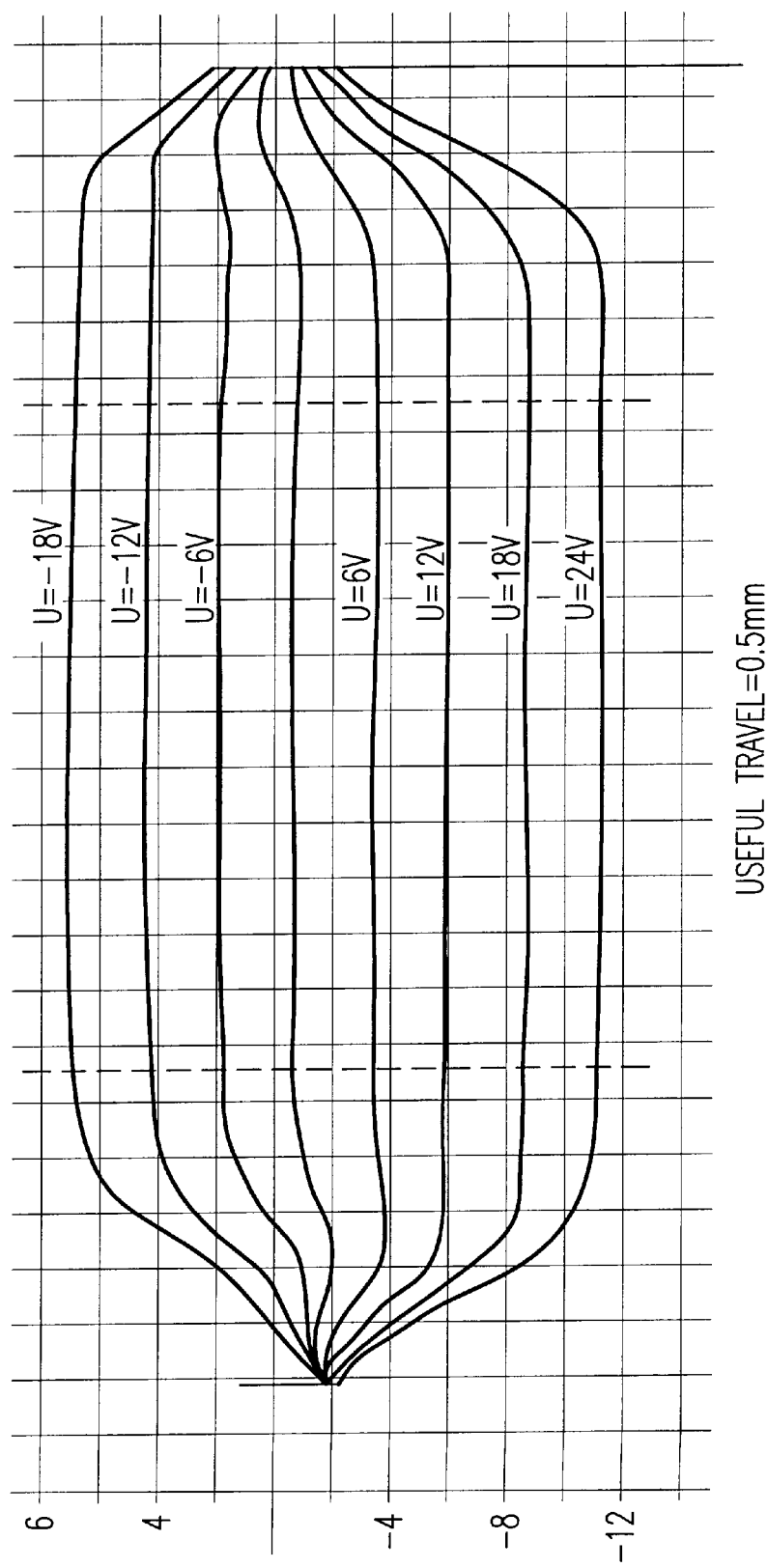
FIG. 2 represents a diagram of the forces as a function of position and of ampere-turns of the actuators according to the invention.

E denotes the air gap between the bottom of the cavity in which the magnet is placed and the plane passing through the surface of the stator poles, without deduction of the thickness of the magnet e denotes the cavity depth Z denotes the width of the useful track of the magnet substantially perpendicular to the plane of FIG. 1 nI denotes the number of ampere-turns in each coil.

For example:

E=1.5 mm;

L=1.2 mm;

e=0.6 mm;

Advantageously the single magnet (12) is magnetized after being placed in yoke (10).

Figure 5:
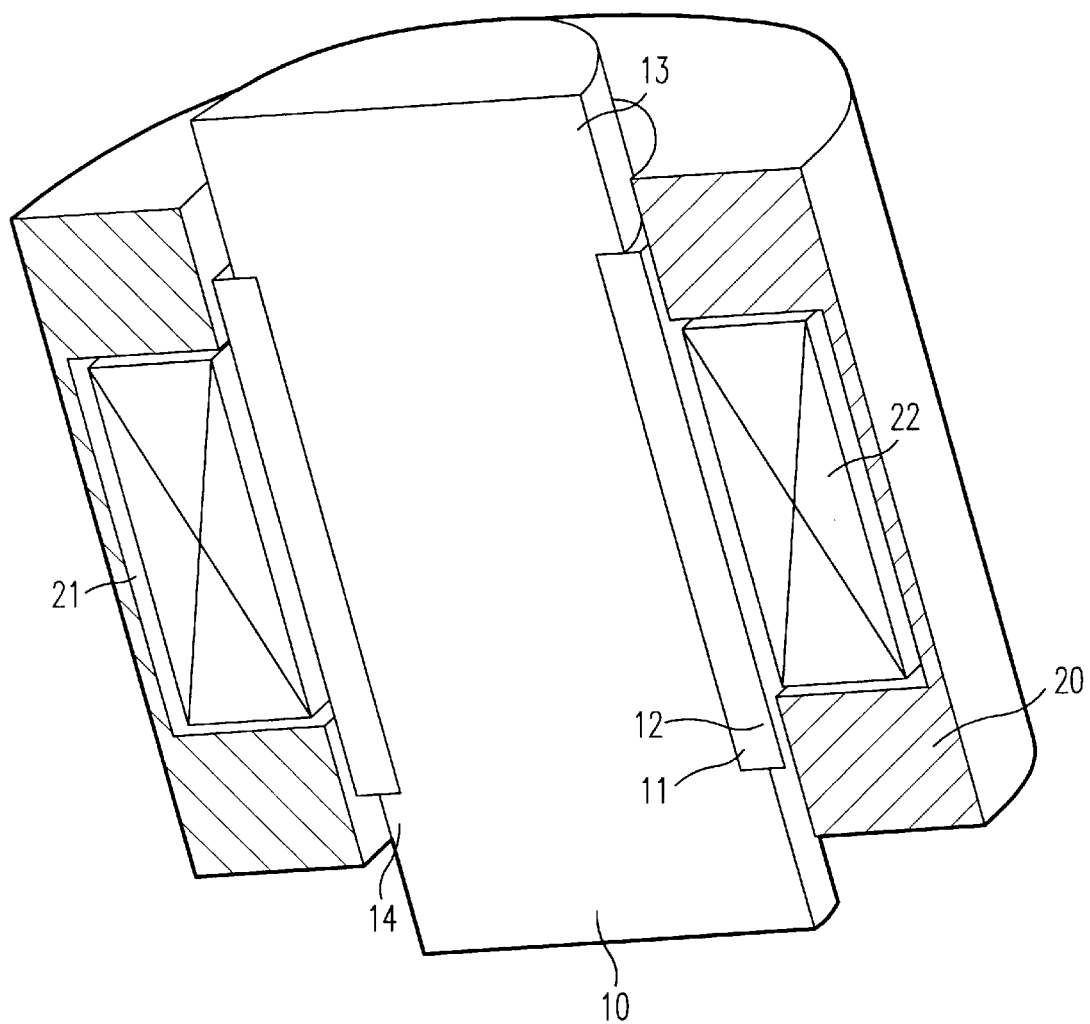
FIG. 5 represents a sectional view of a second embodiment.

FIG. 5 represents a modified embodiment of cylindrical shape. Magnet (12), which has cylindrical shape, is seated in a tubular cavity (11) of depth e formed in a tubular moving yoke (10). Moving yoke (10) is provided on both sides of magnet (12) with lateral extensions (13, 14). Stator portion (1) comprises a stator part (20) of cylindrical shape. This stator part is disposed external to and concentric with moving yoke (10). It is provided with an internal recess (21) for accommodation of an electric coil (22) of tubular shape.

Figure 6:
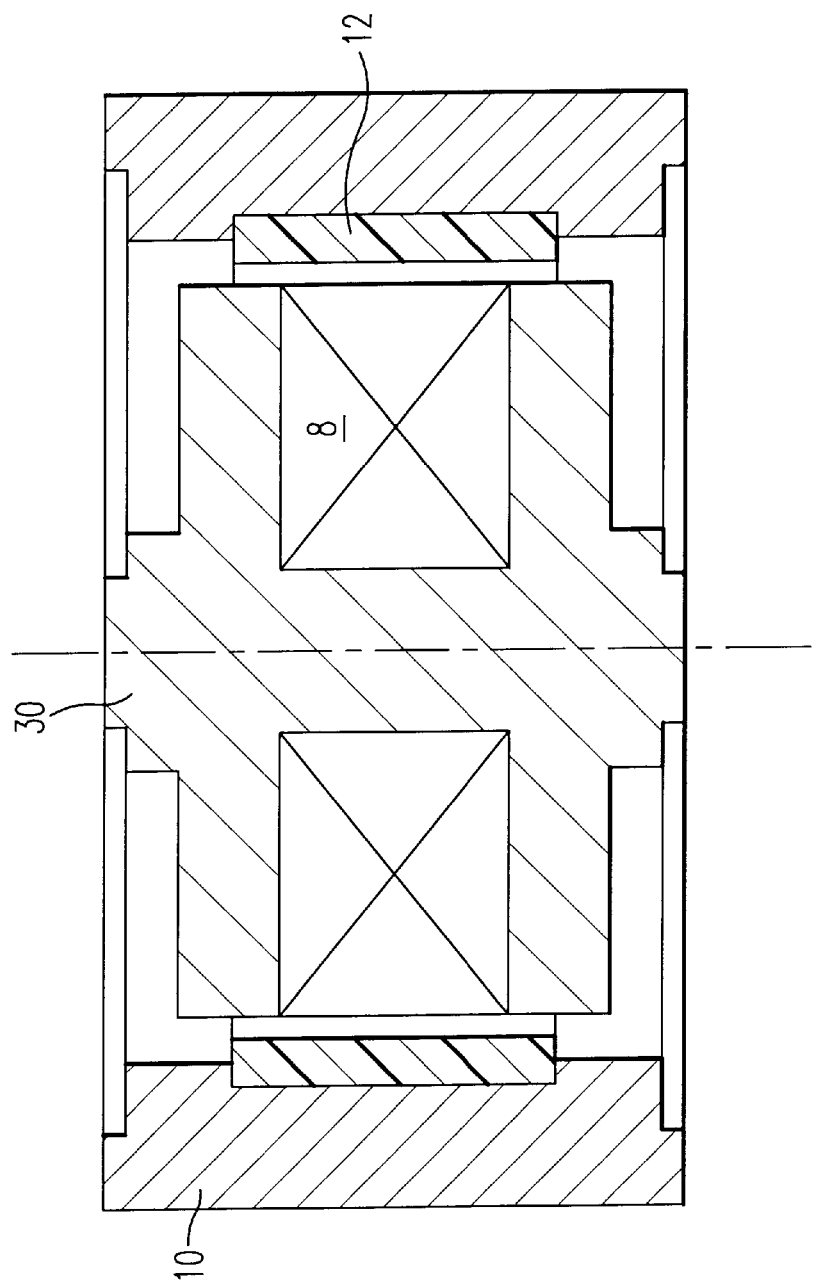
FIG. 6 represents a sectional view of a third embodiment.

FIG. 6 represents a modified embodiment in which moving yoke (10) is external. It coaxially surrounds stator portion (30), which is placed in the interior of the moving yoke.

Figure 7:
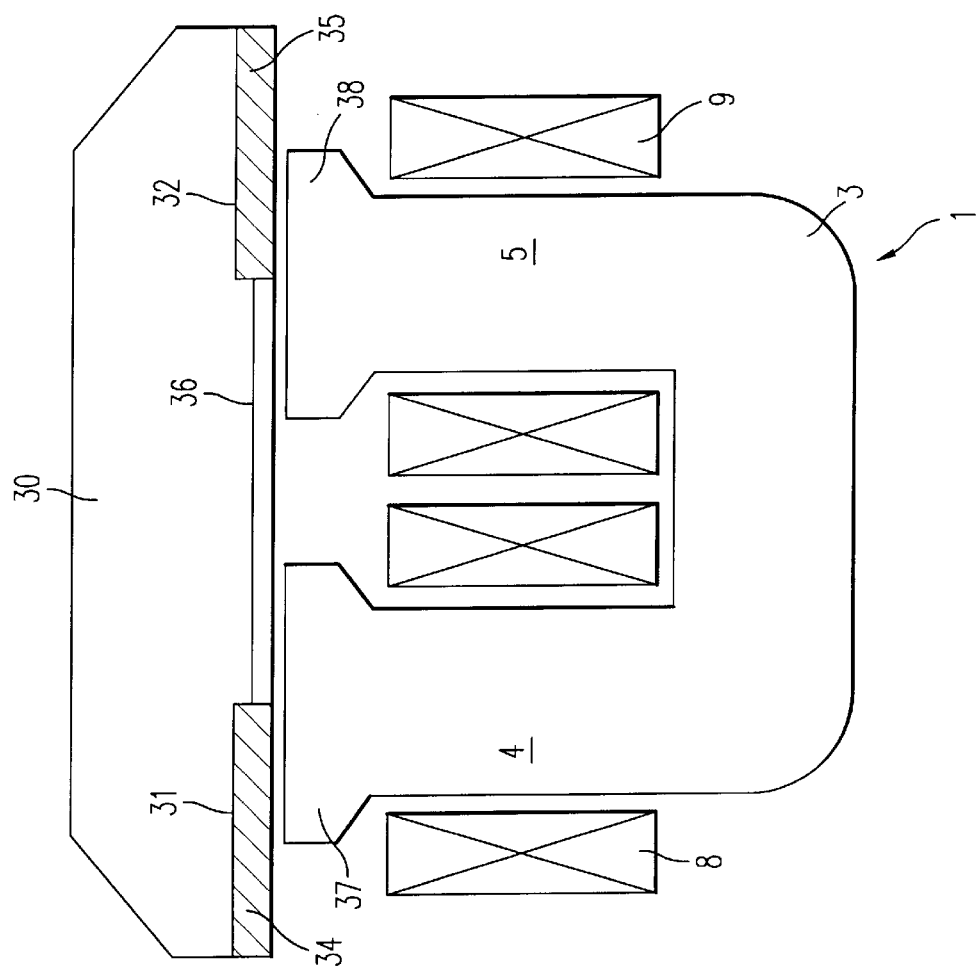
FIG. 7 represents a modified embodiment comprising a moving portion with two magnets.

FIG. 7 represents a modified embodiment. Stator portion (1) is formed by a part (3) of ferromagnetic material provided with two legs (4, 5) having pole pieces (37, 38). Each of the stator legs (4, 5) is wound with an electric coil (8, 9).

Yoke (30) is provided at its ends with two cavities (31, 32) in which there are partly embedded magnets (34, 35), whose width along the axis OX is substantially equal to Xc+E. In the zone between the two magnets (34, 35), the ferromagnetic yoke is provided with a partly projecting zone (36) of thickness e, which is chosen in such a way as to optimize the force, and whose width along the axis OX is substantially equal to Xo+E.

Figure 8:
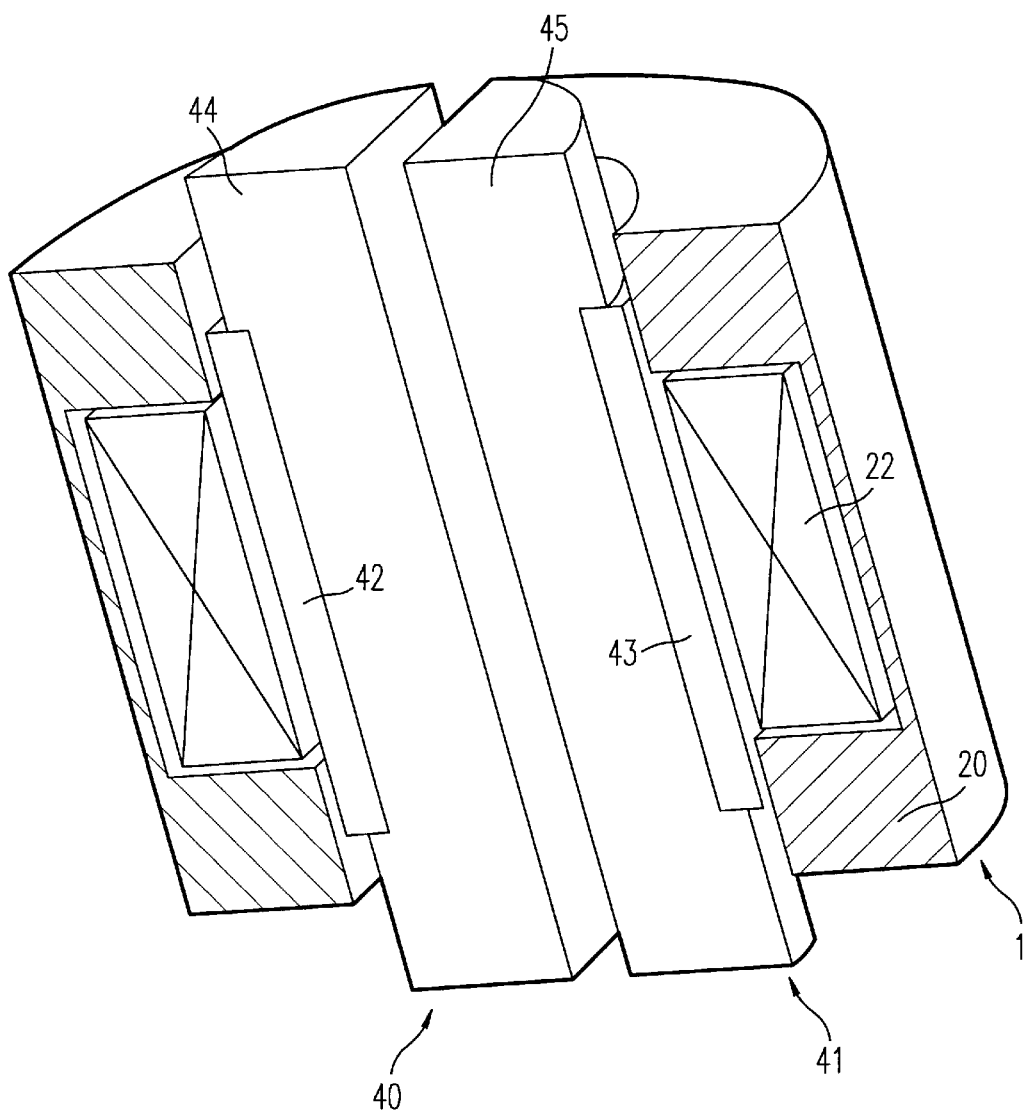
FIG. 8 represents an embodiment comprising two moving portion.

FIG. 8 represents a modified embodiment with two moving portions (40, 41), which under the effect of the current are displaced along the same axis OX but in opposite directions. Each of the moving portions is provided with a magnet (42, 43) partly embedded in a ferromagnetic yoke (44, 45). The magnets of the two moving portions are magnetized in opposite directions.

Stator portion (1) comprises a stator part (20) of cylindrical shape. This stator part is disposed external to moving yokes (44, 45). It is provided with an internal recess (21) in which there is placed an electric coil (22) of tubular shape.

Figure 9:
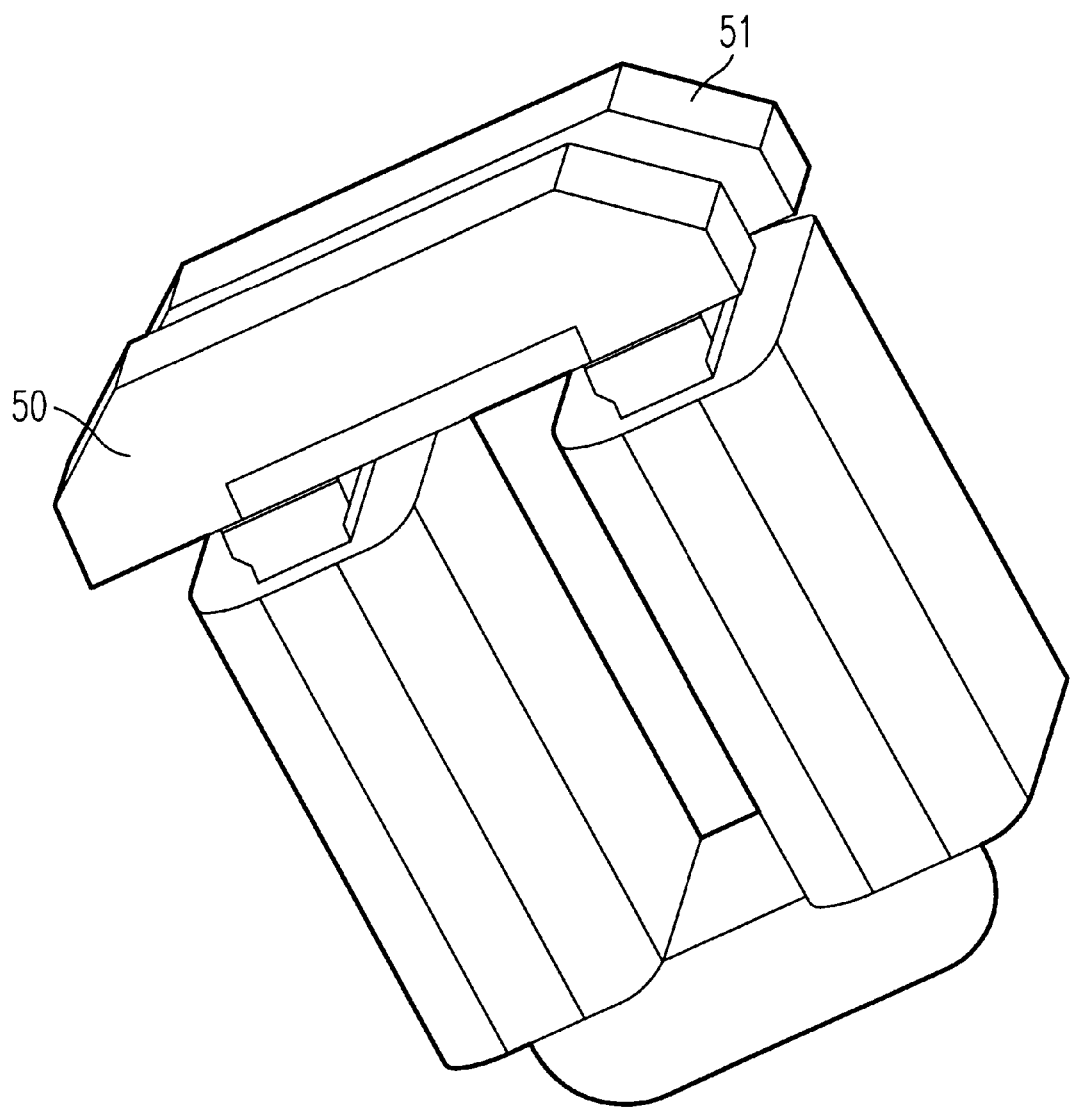
FIG. 9 represents a modified embodiment comprising two moving portions.

FIG. 9 represents a modified embodiment with two moving portions (50, 51) which, under the effect of the current, are displaced along the same axis OX but in opposite directions.

What is claimed is:

1. A linear and single-phase polarized electromagnetic actuator comprising:
    a wound stator and at least one portion which is movable along an axis OX, with a useful travel Xc,
        i) said stator of soft magnetic materials having two poles,
            A) each with a width at least equal to the useful travel Xc,
            B) spaced apart by a distance Xo,
            C) disposed in a same plane surface parallel to the axis OX, and
            D) polarized with opposite sign by at least one coil,
        ii) each said portion which is movable with current energizing the coil, in a direction that depends on a sign of the current, being provided with a moving ferromagnetic yoke of soft magnetic material and at least one magnet connected to said yoke,
            a) said yoke being provided, facing the stator, with three portions
                a1) parallel to said poles of the stator,
                a2) being displaced parallel to said poles,
                a3) at a constant minimum distance Yo measured perpendicular to the axis OX for the closest portion or portions,
            b) said at least one magnet having
                b1) poles parallel to [the] said poles of the stator, and
                b2) a same thickness L measured perpendicular to the axis OX, each portion being further characterized in that;
            c) said at least one magnet of one moving portion
                c1) is partly embedded in a cavity of the moving yoke on one side of said poles of the stator, to a depth e such that 0.1 L<e<0.9 L,
                c2) is displaced with said yoke parallel to said poles of the stator at a minimum constant distance (E−L) wherein E is a distance measured perpendicular to the axis OX between the poles of the stator and a bottom of the cavity, and
                c3) has magnetization which is perpendicular to the axis OX and, in case of a plurality of magnets, is in a same direction,
            d) said yoke has a length measured along the axis OX at least equal to 3 Xc+Xo and is situated at a minimum distance from the stator equal to Yo=E−e, which is greater than E−L.

2. A linear actuator according to claim 1, characterized in that the moving element is provided with a magnet partly embedded in a cavity which is situated substantially in the middle of said yoke, the cavity and the magnet having a width along the axis OX at least equal to Xc+Xo.

3. A linear actuator according to claim 1, characterized in that the moving element is provided with two magnets placed in two cavities, each situated at one end of the said yoke, each cavity and each magnet having a width along the axis OX greater than or equal to Xc.

4. A linear actuator according to claim 1, characterized in that the depth e of a cavity of the yoke is chosen to be as large as possible while keeping a force due to a constant current substantially constant over the entire useful travel, with a variation of less than 15%, the cavity depth then being determined by the maximum value of e meeting the condition $$\frac{F_{nI^2}}{F_{nI}} < 0.15$$

where $F_{nI}$ and $F_{nI^2}$ are the components of the force created by the actuator, increasing with cavity depth e, respectively proportional to the ampere-turns nI and proportional to the square of the ampere-turns $nI^2$, in such a way that, over the useful travel, without saturation, the magnetostatic force component often being negligible, the total force is substantially equal to $$F \approx F_{nI} + F_{nI^2}$$

the $F_{nI^2}/F_{nI}$ ratio being expressed to a first approximation by the equation $$\frac{F_{nI^2}}{F_{nI}} = 0.25 \cdot \frac{X^2}{1-X} \cdot \frac{ni}{H_c \cdot L}$$

where X=e/E represents the coefficient of embedding of a magnet in a cavity of said yoke and E denotes the air gap between the bottom of the cavity in which the magnet is placed and the plane passing through the surface of the stator poles, without deduction of the thickness of the magnet, nI is the magnetic potential created in the magnetic circuit by the current passing through the coil or coils;

$H_c \cdot L$ is the magnetic potential of the magnet, $H_c$ is its coercive field and L is its thickness in the magnetization direction.

5. A linear actuator according to claim 1, characterized in that the depth of a cavity of the yoke is between 40% and 80% of the thickness L of a magnet measured in the magnetization direction, mostly about 60%.

6. A linear actuator according to claim 1, characterized in that the stator structure is provided with two legs each wound by an electric coil.

7. A linear actuator according to claim 1, characterized in that it comprises an external stator structure of tubular shape and is provided with an internal annular recess in which there is seated an annular coil, the moving portion being formed by a ferromagnetic internal annular yoke provided with an annular recess in which there is positioned a radially magnetized annular magnet.

8. A linear actuator according to claim 1, characterized in that it comprises an internal stator structure of tubular shape and is provided with an external annular recess in which there is seated an annular coil, the moving portion being formed by a ferromagnetic external annular yoke provided with an annular recess in which there is positioned a radially magnetized annular magnet.

9. A linear actuator according to claim 1, characterized in that it comprises two moving portions, the magnets of one moving portion being magnetized in the direction opposite to that of the magnets of the other moving portion, the two moving portions being displaced in opposite directions under the effect of the current.

10. A linear actuator according to claim 1, characterized in that the magnets of the moving element are magnetized after they have been placed on the moving element.

11. A linear actuator according to claim 1, characterized in that the magnet or magnets are composed of a plurality of magnets disposed side by side.

12. A linear actuator according to claim 2, characterized in that the magnets of the moving element are magnetized after they have been placed on the moving element.

13. A linear actuator according to claim 3, characterized in that the magnets of the moving element are magnetized after they have been placed on the moving element.

14. A linear actuator according to claim 4, characterized in that the magnets of the moving element are magnetized after they have been placed on the moving element.

15. A linear actuator according to claim 5, characterized in that the magnets of the moving element are magnetized preferably after they have been placed on the moving element.

16. A linear actuator according to claim 6, characterized in that the magnets of the moving element are magnetized after they have been placed on the moving element.

17. A linear actuator according to claim 7, characterized in that the magnets of the moving element are magnetized after they have been placed on the moving element.

18. A linear actuator according to claim 8, characterized in that the magnets of the moving element are magnetized after they have been placed on the moving element.

19. A linear actuator according to claim 9, characterized in that the magnets of the moving element are magnetized after they have been placed on the moving element.

20. A linear actuator according to claim 2, characterized in that the magnet or magnets a re composed of a plurality of magnets disposed side by side.

* * * * *